(12) United States Patent
Hamm et al.

(10) Patent No.: US 8,443,961 B2
(45) Date of Patent: May 21, 2013

(54) GUIDE STRUCTURE FOR STOPPERS

(75) Inventors: Caroline Hamm, Octeville-sur-Mer (FR); Paolo Restori, Octeville-sur-Mer (FR); Emmanuel Roth, Octeville-sur-Mer (FR)

(73) Assignee: Sidel Participations, Octeville-sur-Mer (FR)

( * ) Notice: Subject to any disclaimer, the term of this patent is extended or adjusted under 35 U.S.C. 154(b) by 287 days.

(21) Appl. No.: 12/935,754

(22) PCT Filed: Mar. 31, 2009

(86) PCT No.: PCT/FR2009/050541
§ 371 (c)(1),
(2), (4) Date: Sep. 30, 2010

(87) PCT Pub. No.: WO2009/125154
PCT Pub. Date: Oct. 15, 2009

(65) Prior Publication Data
US 2011/0017568 A1    Jan. 27, 2011

(30) Foreign Application Priority Data
Mar. 31, 2008 (FR) ..................... 08 01740

(51) Int. Cl.
*B67B 1/00* (2006.01)
*B65G 47/14* (2006.01)
(52) U.S. Cl.
USPC ............ 198/389; 198/836.1; 193/25 FT
(58) Field of Classification Search
USPC .. 198/417, 383, 389, 836.1, 836.4; 193/25 E, 193/25 AC, 25 S, 25 FT
See application file for complete search history.

(56) References Cited

U.S. PATENT DOCUMENTS

| 2,510,191 | A | * | 6/1950 | Nobles ................... 193/25 AC |
| 2,797,541 | A |   | 7/1957 | Cookson |
| 2,819,780 | A | * | 1/1958 | Fallon et al. ............ 193/25 AC |
| 2,861,666 | A | * | 11/1958 | Madden ..................... 193/16 |
| 3,086,639 | A |   | 4/1963 | Donofrio |
| 4,219,986 | A |   | 9/1980 | Osterhaus |
| 4,338,851 | A | * | 7/1982 | Bremer et al. ............. 89/33.14 |
| 4,479,574 | A | * | 10/1984 | Julius et al. ............... 198/626.1 |
| 4,856,646 | A | * | 8/1989 | Sjostrand ................... 198/836.1 |

(Continued)

FOREIGN PATENT DOCUMENTS

| CN | 2617689 Y | 5/2004 |
| DE | 95371 C | 9/1896 |

(Continued)

OTHER PUBLICATIONS

Chinese Office Action for Chinese Patent Application No. 200980117796.6, dated Dec. 12, 2011.

(Continued)

*Primary Examiner* — Mark A Deuble
(74) *Attorney, Agent, or Firm* — Sughrue Mion, PLLC

(57) ABSTRACT

The guide structure for stoppers takes the form of a tunnel with a C-shaped section for trapping and guiding the cylindrical part of the stoppers (1c, 1t), which tunnel has opposing edges spaced out at a distance such as to allow the passage of the bulge (3) of the nipple-type stoppers (1t). This structure consists of filamentary rails (5) and of plates (6) with a hole through their central part shaped according to the profile of the stoppers that are to be transferred.

8 Claims, 1 Drawing Sheet

U.S. PATENT DOCUMENTS

| | | | | |
|---|---|---|---|---|
| 5,097,943 A | * | 3/1992 | Kawasaki et al. | 198/836.1 |
| 5,609,237 A | * | 3/1997 | Lenhart | 198/406 |
| 6,318,935 B1 | * | 11/2001 | Ouellette | 406/83 |
| 7,815,041 B2 | * | 10/2010 | Guenther | 198/836.3 |

FOREIGN PATENT DOCUMENTS

| | | |
|---|---|---|
| EP | 0 014 173 A2 | 8/1980 |
| FR | 1 174 292 A | 3/1959 |
| FR | 1 270 304 A | 8/1961 |
| GB | 748356 A | 5/1956 |
| WO | WO 83/03559 A1 | 10/1983 |
| WO | 2006/070643 A1 | 7/2006 |

OTHER PUBLICATIONS

French Search Report for FR 0801740, dated Nov. 3, 2008.
International Search Report for PCT/FR2009/050541, dated Oct. 20, 2009.

* cited by examiner

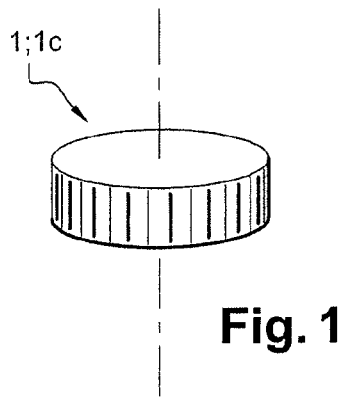
Fig. 1
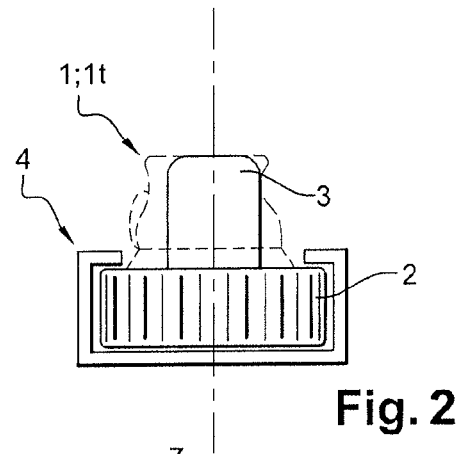
Fig. 2
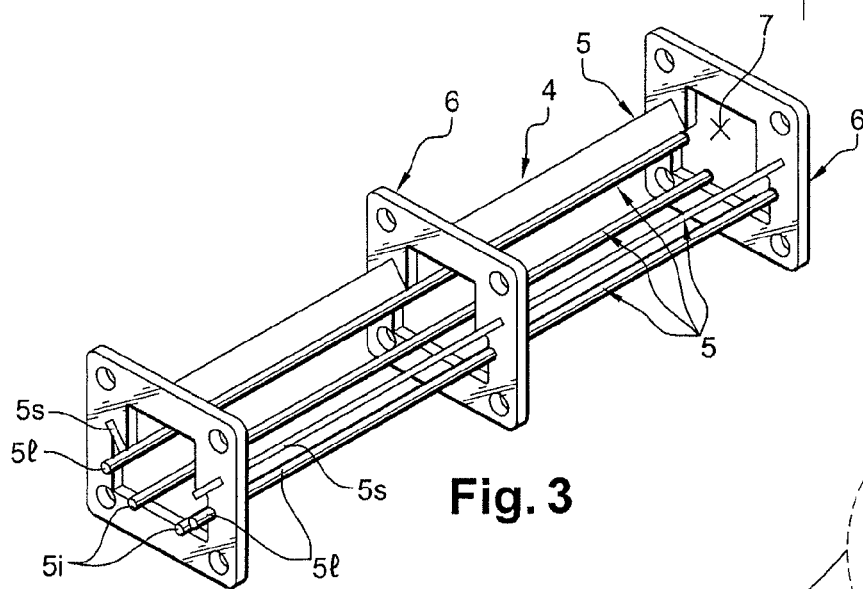
Fig. 3
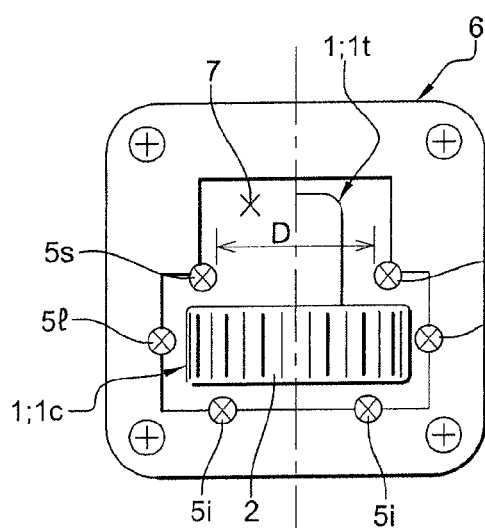
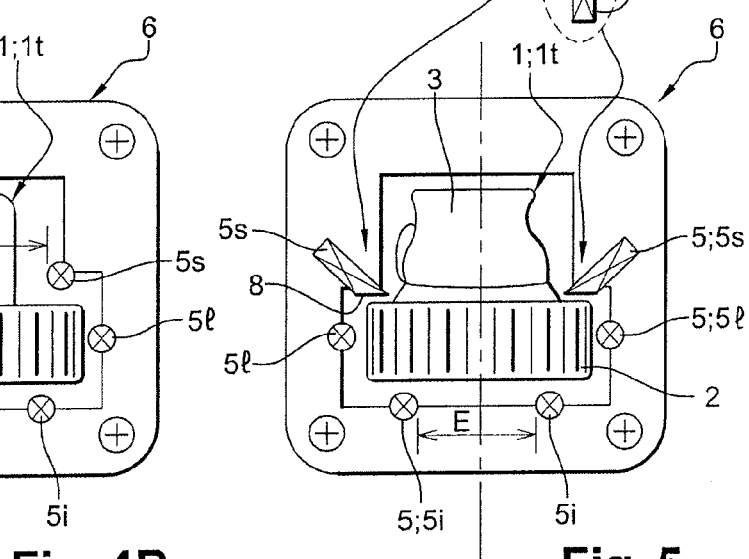
Fig. 4A    Fig. 4B                    Fig. 5

GUIDE STRUCTURE FOR STOPPERS

FIELD OF THE INVENTION

The present invention relates to a guide structure for stoppers and, more particularly, to a structure which is interposed between a preparation machine, where the stoppers are manipulated in order to be aligned correctly, and a drawing-off machine where they are put in position in order to close off bottles or flasks.

DESCRIPTION OF THE PRIOR ART

The conveying of stoppers from one station to another, between machines, generally takes place under simple gravity, but, in order to avoid the risk of jamming, the stoppers need to be guided with great precision in a sort of tunnel which consists of guide rails. This precision is all the more difficult to maintain because the paths taken by the stoppers are never rectilinear and they are sometimes extremely tortuous.

As a result, guide structures are assessed and produced for every type of stopper and the precision which results therefrom makes it possible to obtain very high conveying speeds, with great fluidity, with no risk of jamming.

In document FR 1 270 304, for example, the stoppers consist of a cylindrical part and, under this cylindrical part, of a frustoconical part which has a large screw thread. The contour of this stopper resembles a contour of a stopper having a teat and is inscribed in a guide structure which comprises, firstly, a slideway which consists of a sheet metal base and, secondly, of two round bars which flank the frustoconical part of the stopper by the large screw thread; the sheet metal base and the two round bars delimit the guide tunnel by surrounding the flat surfaces of the cylindrical part of the stopper.

Further structures of this type are able to guide stoppers having complex forms with two parts, as shown, for example in documents FR 1 174 292, U.S. Pat. No. 2,797,541 and EP 14 173; document WO 2006/070643, too, shows a guide structure which is in the form of a rigid rectilinear profile.

The problems of guiding stoppers are always the same with, today, in addition, problems associated with the flexibility of the plants for preparing bottles. Drawing-off plants today are intended to be more multipurpose; they are required to take several models of stopper such as, for example, conventional, simply cylindrical bottle stoppers, or more sophisticated stoppers having a teat.

These stoppers having a teat have the particular feature of having two parts with very different forms: a cylindrical body, which is fastened by screwing or some other means on the neck of the bottle, and a teat, which projects out of the top of this cylindrical body. The cylindrical part corresponds to a conventional cylindrical stopper, whereas the teat forms a sort of dome which projects out of the top of this cylindrical part.

The guide structure described, in particular, in the above-mentioned document FR 1 270 304 is absolutely not provided or designed to guide a plurality of types of stopper. This structure is exclusively for guiding conventional cylindrical stoppers.

SUMMARY OF THE INVENTION

The present invention provides a design of this kind of guide structure which, without impairing the precision of guidance of the stoppers, gives this guide structure a truly multipurpose nature, that is to say that it becomes capable of conveying a plurality of types of stopper: conventional cylindrical stoppers and stoppers which, while having the same type of cylindrical body, are surmounted by a protuberance which corresponds to a teat having a more or less complicated form.

The guide structure according to the invention is thus in the form of a tunnel able to enclose and guide the cylindrical part of the stopper to be carried, whether it be the cylindrical part of a conventional stopper or the cylindrical part of a stopper having a teat, said tunnel comprising, firstly, mounting plates located transversely with respect to the running direction of said stoppers and distributed regularly over its length, and, secondly, thread-like rails which extend from its inlet as far as its outlet, said rails being fastened on the contour of the central passage cut through the various mounting plates and being divided into a plurality of groups:

rails which act as a slideway for guiding the large flat surface of the cylindrical part of the stoppers,
lateral rails which flank the cylindrical part of the stoppers,
rails for closing the tunnel, which engage with the annular flat surface of said cylindrical body of the stoppers and which are spaced apart by a distance corresponding at least to the diameter of the protuberance of the stoppers of the type having a teat, in order to flank this teat.

Also according to the invention, the rails forming the slideway and the lateral rails have a circular section.

According to another arrangement of the invention, when the stoppers of the type having a teat have, at the junction between the cylindrical body and the protuberance forming said teat, an annular flat surface which is too weak to guide efficiently, the tunnel comprises closing rails of polygonal section, of which the edge forming the guide surface is flat and located in a plane parallel to that of the slideway.

Also according to the invention, the closing rails are in the form of bars of which the section is square or rectangular.

According to a preferential embodiment, the closing rails are in the form of bars having a trapezoidal section and the flat guide surface of these rails corresponds to a beveled design of one of the sides of said bar, said bar being, furthermore, inclined at an angle of around 45° with respect to the surface of the slideway of the tunnel, in order to avoid the collection of dirt and to facilitate cleaning of the guide structure.

Also according to the invention, the guide rails forming the slideway of the tunnel are spaced apart at a distance chosen to enable, if need be, nozzles for rinsing and/or washing the stoppers to pass through.

According to another arrangement of the invention, the different guide rails may be produced, wholly or in part, from metal profiles or thermoplastic material.

BRIEF DESCRIPTION OF THE DRAWINGS

More detail of the invention will be given with the aid of the following description and the appended drawings, which are given by way of indication and in which:

FIG. 1 shows a conventional cylindrical stopper able to be guided in a guide structure according to the invention;

FIG. 2 is a profile view of a more complicated stopper which is guided in a guide structure according to the invention, said stopper consisting of a cylindrical body, as for the stopper in FIG. 1, and comprising, on this body, a protuberance in the form of a teat with, for example, a cap;

FIG. 3 shows a portion of an embodiment of the guide structure designed to accept and carry the stoppers shown in the preceding FIGS. 1 and 2;

FIG. 4A is a half-section of the guide structure shown in FIG. 3, in which a stopper having a cylindrical body is moving;

FIG. 4B is also a half-section, showing a stopper having, for example, a capless teat; and FIG. 5 is a section of another embodiment of the tunnel, having a variant of the stopper of the type having a teat with a cap and, accompanying this figure, but positioned separately and above the latter, a plurality of models of rail sections constituting variants able to serve as guide rails for the flat annular surface of the cylindrical body of the stoppers.

DETAILED DESCRIPTION OF THE INVENTION

The stopper (1), or top, shown in FIG. 1, corresponds to a conventional stopper (1c) for bottles made of thermoplastic, for example. It is in the form of a hollow cylinder having two flat surfaces.

The stopper (1) represented in FIG. 2 corresponds to a stopper (1t) commonly called a teat top. It comprises a cylindrical body (2), the dimensions of which correspond approximately to those of the stopper (1c), and this body (2) is surmounted by a protuberance (3); this protuberance (3), which forms the teat, can be relatively complicated in form and may comprise, as shown in the figure, a cap which covers the actual teat.

The two types of stopper (1c and 1t) can thus move in the guide structure (4) in the form of a tunnel, as shown in FIG. 2 and as shown in part in FIG. 3, in the form of a segment of tunnel.

This guide structure (4) has a C-shaped section with opposing lips extending towards one another and partially overlapping the top of the cylindrical body (2).

The structure (4) guides the stoppers (1) and in particular guides their single cylindrical part.

The form and diameter of the protuberance (3) constituting the teat can vary and influence the choice of guide rails, as explained in detail hereinbelow. It is this choice that will make it possible to make conveying more secure, that is to say to avoid the risks of the stoppers jamming.

As shown in FIG. 3, this guide structure (4) forms a sort of tunnel which extends between a preparation machine (not shown), where the stoppers are sorted and aligned, and a bottle stoppering machine (also not shown).

In the embodiment of FIG. 3, the structure (4) consists of a plurality of thread-like rails (5) and a plurality of mounting plates (6), which are distributed regularly along the length of the tunnel and on which the various rails (5) are fitted. These mounting plates (6) are arranged transversely with respect to the running direction of the stoppers in the tunnel.

The rails (5) are distributed so as to enclose the single cylindrical part of each type of stopper, that is to say the cylindrical body (2). Thus, there are:—two rails (5i) which are arranged so as to form a slideway to guide the large flat surface of the cylindrical part of the stoppers (1),—two rails (5l) which laterally guide said cylindrical body, and—two closing rails (5s) which guide the other flat surface of said cylindrical body, which surface has an annular form.

The mounting plates (6) serve both as a guide and a bracket for positioning and fastening the rails (5) and are distributed regularly, every 10 to 20 cm, for example, in order to avoid any deformation and to ensure great precision in the guide section for the stoppers (1), whatever form the latter have.

The mounting plates (6) are, for example, shaped in the form of a square, or other shaped, plate and comprise in their central part a cutout (7), the form of which is dictated by the contour of the stopper (1t) of the type having a teat.

The rails (5) consist of profiles having a circular, or other shaped, section. These profiles may be metallic, in which case they are welded to the mounting plates (6); they may also consist of thermoplastic profiles which lock into appropriate housings provided on the various mounting plates (6).

FIG. 4 shows a type of mounting plate (6) having a cutout (7) suitable for the shape and size of the stopper (1), whether it be the simply cylindrical stopper (1c), as shown in FIG. 4A, or the stopper (1t) having a teat, as shown in FIG. 4B.

The half stopper (1t), shown in FIG. 4B, has a large flat shoulder around the teat (3), having an annular form; this model of stopper (1t), having a small teat, without a cap, for example, makes it possible to guide the cylindrical body with rails (5) which may all consist of threads having a cylindrical section: —the rails (5i) that form the slideway, —the rails (5l) for lateral guidance and —the two closing rails (5s), which constitute the lips of the C section of the structure (4) in the form of a tunnel.

The distance D between the two rails (5s) is chosen in accordance with the diameter of the teat (3). Depending on the diameter of this teat (3), the guide surface around said teat can turn out to be insufficient to efficiently guide it with rails (5s) having a circular section.

FIG. 5 shows another model of stopper (1t), having a larger protuberance (3) on account of the presence of a cap on the teat; this protuberance (3) makes it necessary to guide the annular flat surface of the cylindrical body (2) with rails (5s) that have a flat surface (8), said surface (8) coming into greater contact with and guiding the stopper (1t) better. This flat surface (8) of the rails (5s) is parallel to that of the slideway formed by the rails (5i).

In FIG. 5, the rails (5s) are in the form of bars having a polygonal section, in the form of a trapezoid, having a beveled edge (8) which acts as a guide surface. These rails (5s) are arranged in an inclined manner with respect to the plane of the slideway formed by the rails (5i). This inclination, of around 45° with respect to the surface of the slideway formed by the rails (5i), limits the collection of dirt liable to be deposited on the flat annular surface of the body of the stopper; this inclination also makes it easier to clean the closing rails (5s) of the tunnel and avoids the stagnation of the cleaning products.

Guiding on the flat annular surface of the cylindrical part of the stoppers can also be carried out by means of rails (5s) having a square or rectangular section, as shown separately, above FIG. 5. These rails (5s) are positioned such that one of their flat surfaces is in the position for guiding the flat annular surface of the cylindrical body of the stopper.

Also in FIG. 5, it can be seen that the rails (5i) forming the guide slideway are spaced apart at a distance E; this distance is chosen for the best possible guidance in order to avoid rocking of the stoppers (1); it is also chosen to allow nozzles (not shown) for washing and/or rinsing the stoppers to pass through.

The invention claimed is:

1. A guide structure for stoppers with or without a teat, said structure being in the form of a tunnel able to enclose and guide a cylindrical part of said stoppers, said tunnel comprising, firstly, mounting plates located transversely with respect to the running direction of said stoppers in said tunnel and distributed regularly over its length, and, secondly, rails which extend from its inlet as far as its outlet, said rails being fastened on the contour of a central passage cut through the mounting plates and being divided into a plurality of groups:

thread-like rails which act as a slideway for guiding the large flat surface of the cylindrical part of the stoppers, thread-like lateral rails which flank said cylindrical part of the stoppers, closing rails for closing said tunnel, which engage with the annular flat surface of said cylindrical body of the stoppers and which are spaced apart by a distance D corresponding at least to the diameter of the protuberance of the stoppers having a teat, in order to flank this teat;

wherein the closing rails have a polygonal section, of which an edge forming a guide surface is flat and located in a plane parallel to that of the slideway formed by the thread-like rails.

2. The guide structure for stoppers as claimed in claim 1, wherein, on the closing rails which serve to guide the annular flat surface of the cylindrical body of the stoppers, the edge which forms the guide surface corresponds to one side of said closing rails, of which the section is square or rectangular.

3. The guide structure for stoppers as claimed in claim 1, wherein the closing rails, which serve to guide the annular flat surface of the cylindrical body of the stoppers, are in the form of bars having a trapezoidal section, and the guide surface of the closing rails corresponds to a beveled design of one edge of said bar.

4. The guide structure for stoppers as claimed in claim 3, wherein the closing rails in the form of bars are inclined with respect to the surface of the slideway of the tunnel in order to limit the collection of dirt and also to facilitate cleaning while avoiding the stagnation of the cleaning products.

5. The guide structure for stoppers as claimed in claim 4, wherein the closing rails are inclined at an angle of around 45° with respect to the surface of the slideway of the tunnel.

6. The guide structure for stoppers as claimed in claim 1, wherein the thread-like rails forming the slideway of the tunnel are spaced apart at a distance E which enables nozzles for washing the stoppers to pass through.

7. The guide structure for stoppers as claimed in claim 1, wherein the rails are formed, wholly or in part, of metal profiles.

8. The guide structure for stoppers as claimed in claim 1, wherein the rails are formed, wholly or in part, of thermoplastic profiles.

* * * * *